United States Patent [19]  [11] 3,891,681
Saltzman  [45] June 24, 1975

[54] SYNTHESIS OF STEROIDS
[75] Inventor: William H. Saltzman, New Rochelle, N.Y.
[73] Assignee: Intellectual Property Development Corporation, New Rochelle, N.Y.
[22] Filed: Nov. 26, 1973
[21] Appl. No.: 419,014

Related U.S. Application Data
[63] Continuation of Ser. No. 307,060, Nov. 16, 1972, Pat. No. 3,833,260.

[52] U.S. Cl. ............................................ 260/397.1
[51] Int. Cl.² ........................................... C07J 9/00
[58] Field of Search .................................................
/Machine Searched Steroids

[56] References Cited
OTHER PUBLICATIONS
Levine et al., J.A.C.S., Vol. 82, pp. 3391–3395, 7/5/60.
Hazen et al., Jour. Org. Chem., Vol. 29, pp. 1930–1931, 1964.
Dferassi, Steroid Reactions, pp. 239, (1963).

*Primary Examiner*—Elbert L. Roberts

[57] ABSTRACT
This invention relates to novel methods of synthesizing $3\alpha,7\alpha$-dihydroxy-$5\beta$-cholanic acid, and to novel intermediates therefor.

8 Claims, No Drawings

SYNTHESIS OF STEROIDS

This application is a continuation in part application of my prior filed, copending application Ser. No. 307060, filed Nov. 16, 1972 now U.S. Pat. No. 3833260.

This invention relates to and has for its object the synthesis of 3α,7α-dihydroxy-5β-cholanic acid and novel intermediates therefor. The final compounds of this invention are known and have been found to possess useful biological properties.

A novel method has been discovered for the production of 3α,7α-dihydroxy-5β-cholanic acid, which entails a number of steps beginning with 3α,7α,12α-trihydroxy-5β-cholanic acid or analogs thereof as starting material. More particularly, this invention involves the method of producing 3α,7α-dihydroxy-5β-cholanic acid directly from 3α,7α,12α-trihydroxy-5β-cholanic acid or analogs thereof and is more fully and clearly illustrated by the following chemical equations wherein R, Z, Y and X are as defined in the respective formulae below:

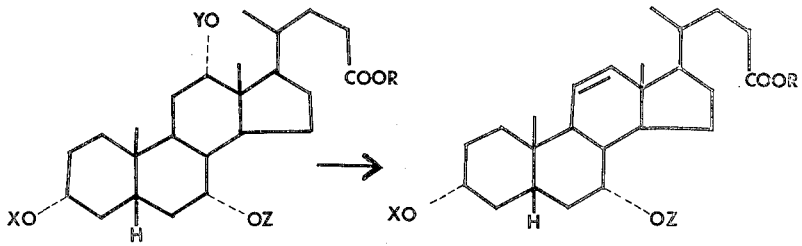

I. X=Y=Z=R=H
II. X=Z=COCH-;-Y=H; R=CH₃
III. X=Z=COCH₃; R=CH₃

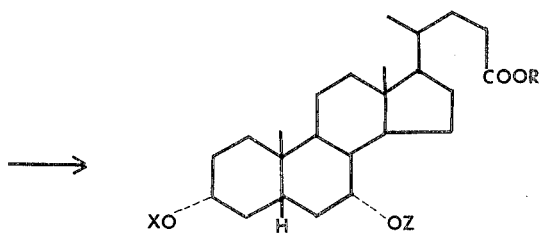

IV. X=Z=COCH₃; R=CH₃
V. X=Z=R=H

In the first step of the process of this invention, the compounds of formula A may be treated to obtain the compounds of formula B. More particularly, it has been found that it is possible to obtain the 11-ene compounds (compounds B) from the 3,7,12-triol compounds (Compounds A) by treating Compounds A with a strong dehydration agent. The dehydration agents which have been found to be suitable in the practice of this invention include such dehydration agents as, methane sulfonyl chloride, thionyl chloride or methyl chlorosulfite in the presence of an organic base, for example, pyridine. By the practice of this invention it has been found possible to obtain the desired 11-ene compounds (compounds B) which may then be further treated in accordance with the instant invention to yield the desired 3α,7α-diol final products of this invention.

The final 3α,7α-diol compounds (Compounds C) are then obtained by the hydrogenation of the 11-ene compounds (Compounds B), for example, by catalytic hydrogenation, such as by hydrogenation in acetic acid in the presence of a palladium over charcoal catalyst, a procedure which is well known in the art.

The preferred acyl or acyloxy radicals of this invention are those of hydrocarbon carboxylic acids of twelve carbon atoms or less and include such acids as the lower alkanoic acids, the lower alkenoic acids, the cycloalkanoic acids, the cycloalkenoic acids, the aryl carboxylic acids, and other like hydrocarbon carboxylic acids.

The preferred alkyl radicals of this invention are those of six or less carbon atoms and may be characterized by the term, "lower alkyl". Thus, as employed herein, lower alkyl is meant to include such moieties as methyl, ethyl, propyl, t.-butyl, pentyl and the like.

The final products of this invention are useful in the medical treatment of various disorders, for example, the treatment of hypertriglyceridemia, and may be employed for such purposes in the dosage forms and amounts as may be determined to be effective by the skilled worker practicing the invention.

The invention may be further illustrated by the following examples:

EXAMPLE 1

Methyl 3α, 7α-diacetoxy-5β-chol-11-en-3α,7α-diol-24-oic acid

To a solution of methyl-3α,7α-diacetoxy-5β-cholan-3α, 7α,12α-triol-24-oic acid, prepared in accordance with the procedure set forth by Feiser, et. al. in Volume 72, Journal of the American Chemical Society, page 5530 (1950), in dimethylformamide is added pyridine and methanesulfonyl chloride and the mixture held overnight at room temperature. Water is added and the reaction mixture extracted with ethyl acetate. The ethyl acetate layer is washed with water, dried with magnesium sulfate and evaporated. Recrystallization of the crude product from ethyl acetate-hexane yields methyl 3α,7α-diacetoxy-5β-chol-11-en-3α, 7α-diol-24-oic acid.

EXAMPLE 2

Methyl 3α,7α-diacetoxy-5β-chol-11-en-3α,7α-diol-24-oic acid

The procedure of Example 1 is followed except that an equivalent amount of methyl chlorosulfite is substituted for methanesulfonyl chloride, to yield the methyl 3α,7α-diacetoxy-5β-chol-11-en-3α,7α-diol-24-oic acid.

EXAMPLE 3

Methyl 3α,7α-diacetoxy-5β-chol-11-en-3α,7α-diol-24-oic acid

To a solution of methyl 3α,7α-diacetoxy-5β-cholan-3α,7α, 12α-triol-24-oic acid in pyridine was added thionyl chloride and the mixture held at room temperature overnight. The reaction mixture was then poured into iced water and the resultant precipitate collected, washed and dried. The resultant material was then recrystallized from methanol to yield methyl 3α,7α-diacetoxy-5β-chol-11-en-3α,7α-diol-24-oic acid.

EXAMPLE 4

Methyl 3α,7α-diacetoxy-5β-cholan-3α, 7α-diol-24-oic acid

Methyl 3α,7α-diacetoxy-5β-chol-11-en-3α,7α-diol-24-oic acid was subjected to hydrogenation in acetic acid in the presence of palladium on charcoal and the resultant product was recrystallized from methanol to yield methyl-3α,7α-diacetoxy-5β-cholan-3α,7α-diol-24-oic acid.

EXAMPLE 5

3α,7α-Dihydroxy-5β-Cholanic Acid

Methyl 3α,7α-diacetoxy-5β-cholan-3α,7α-diol-24-oic acid was refluxed in a 5 percent alcoholic solution of potassium hydroxide for four hours. Upon recrystallization of the resultant product from ethyl acetate there was obtained 3α,7α-dihydroxy-5β-cholanic acid.

In the formulae set forth herein and the Claims appended hereto, X and Z may be hydrogen or acyl, while R may be hydrogen or lower alkyl, all without departing from the satisfactory practice of the instant invention.

The invention may be variously otherwise embodied within the scope of the appended claims.

What is claimed is:

1. The method of producing compounds of the formula

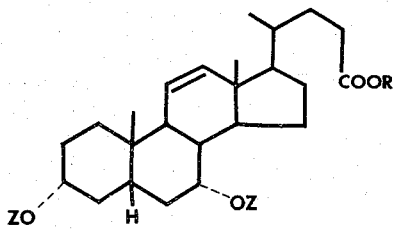

which comprises reacting a compound of the formula

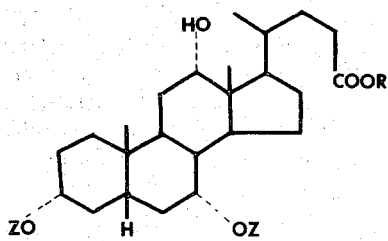

wherein each Z is hydrogen or acyl; and R is hydrogen or lower alkyl; with a dehydrating agent selected from the group consisting of methane sulfonyl chloride, methyl chlorosulfite, and thionyl chloride.

2. The method of claim 1 wherein the dehydrating agent is thionyl chloride.

3. The method of claim 1 wherein the dehydrating agent is methane sulfonyl chloride.

4. The method of claim 1, wherein the dehydrating agent is methylchlorosulfite.

5. The method of producing a compound of the formula

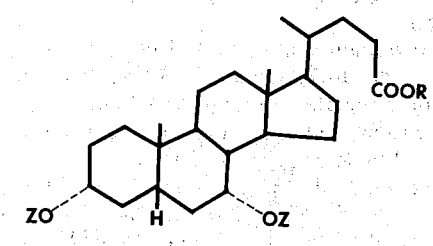

wherein Z and R are as defined in claim 1; which comprises;

a. Dehydrating a compound of the formula:

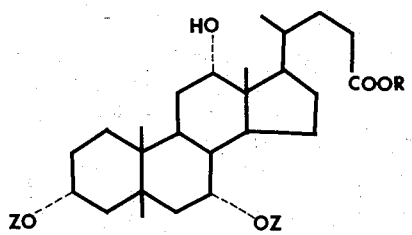

wherein Z and R are as defined in claim 1, by treatment with a dehydrating agent selected from the group consisting of thionyl chloride, methane sulfonyl chloride and methyl chlorosulfite, to yield the 11-ene compound of the formula:

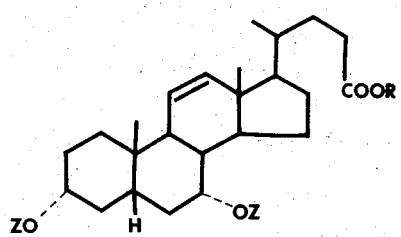

wherein Z and R are as defined in claim 1; and b. Hydrogenating said 11-ene compound to yield the desired final product.

6. The method of claim 5, wherein in step a., the dehydrating agent is thionyl chloride.

7. The method of claim 5, wherein in step a., the dehydrating agent is methane sulfonyl chloride.

8. The method of claim 5, wherein in step a., the dehydrating agent is methyl chlorosulfite.

* * * * *